US006988608B2

(12) United States Patent
Pietz

(10) Patent No.: US 6,988,608 B2
(45) Date of Patent: Jan. 24, 2006

(54) DRIVE SYSTEM FOR ESCALATORS AND PEDESTRIAN CONVEYORS

(75) Inventor: Alexander Pietz, Berlin (DE)

(73) Assignee: Kone Corporation, Helsinki (FI)

( * ) Notice: Subject to any disclaimer, the term of this patent is extended or adjusted under 35 U.S.C. 154(b) by 116 days.

(21) Appl. No.: 10/464,555

(22) Filed: Jun. 19, 2003

(65) Prior Publication Data

US 2003/0221934 A1 Dec. 4, 2003

Related U.S. Application Data

(63) Continuation of application No. PCT/EP01/13895, filed on Nov. 28, 2001.

(30) Foreign Application Priority Data

Dec. 21, 2000 (DE) ........................................ 100 63 844

(51) Int. Cl.
*B65G 15/60* (2006.01)
*B66B 21/00* (2006.01)
*B66B 23/02* (2006.01)

(52) U.S. Cl. ........................ 198/326; 198/330; 198/838

(58) Field of Classification Search ................. 198/326, 198/330, 832, 838
See application file for complete search history.

(56) References Cited

U.S. PATENT DOCUMENTS 1,173,076 A * 2/1916 Winski ....................... 198/834
2,005,067 A * 6/1935 Graff-Baker ................ 198/330
2,686,585 A * 8/1954 Margles et al. ............. 198/332
3,052,133 A * 9/1962 Bradley ...................... 198/327
3,499,340 A * 3/1970 Taranishi et al. ........... 198/330
5,775,477 A 7/1998 Brunn
5,819,910 A 10/1998 Langer et al.
6,016,902 A 1/2000 Kwon
6,634,463 B2 * 10/2003 Spannhake et al. ......... 198/330

FOREIGN PATENT DOCUMENTS

| | | |
|---|---|---|
| DE | 688 444 | 2/1940 |
| DE | 1 829 806 | 4/1961 |
| DE | 1 756 813 | 9/1970 |
| DE | 17 56 813 | 9/1970 |
| DE | 7429118 | 8/1974 |
| DE | 23 46 266 | 3/1975 |
| DE | 199 58 709 A1 | 6/2001 |
| EP | 0 390 630 A1 | 10/1990 |
| EP | 0 390 630 | 10/1990 |
| GB | 2 175 761 | 12/1986 |
| JP | 09193604 | 7/1997 |

OTHER PUBLICATIONS

Miyata Hiroichi, "Step Chain Buffer Device For Passenger Conveyor", Patent Abstract of Japan 11 035262, vol. 1999, No. 05, (1999).

* cited by examiner

*Primary Examiner*—Gene O. Crawford
(74) *Attorney, Agent, or Firm*—Venable LLP; Robert Kinberg

(57) ABSTRACT

A drive system for escalators and pedestrian conveyors having a plurality of steps and pallets, respectively, is provided. The drive system includes at least one driving chain including links and joints connecting the links. The driving chain has a chain pitch such that there are no more than two links per step or pallet and the driving chain is connectable to the plurality of steps or pallets via bolts that are positioned between two joints and provided with a roller. The drive system also includes a plurality of interspaced reversing elements having a number of teeth that correspond to the chain pitch.

9 Claims, 3 Drawing Sheets

DRIVE SYSTEM FOR ESCALATORS AND PEDESTRIAN CONVEYORS

CROSS REFERENCE TO RELATED APPLICATIONS

This application is a continuation of International Application No. PCT/EP01/13895, filed on Nov. 28, 2001, which claims priority to German Application DE 100 63 844.9, filed on Dec. 21, 2000.

BACKGROUND OF THE INVENTION

1. Field of the Invention

The invention relates to a drive system for escalators and pedestrian conveyors. More specifically, the invention related to a drive system for escalators and pedestrian conveyors having at least one driving chain.

2. Related Art

Generally known are so called escalators and pedestrian conveyors, which are intended for indoor use, for example in department stores or the like. Such escalators and pedestrian conveyors are provided with driving chains, in which, with regard to the relatively low forces, the step or pallet bolts including the rollers, which cooperate with the steps or pallets, are positioned in the respective joint areas of the driving chains.

Also known are heavy load escalators, which are used outdoors, for example in underground shafts or the like. In heavy load escalators, roller chains are usually used as driving elements, the step rolls being provided outside the driving chain in view of the bigger dimensioned drives. The constructional effort in a heavy load escalator is much higher than for a department store escalator, whereby also the total width of the heavy load escalator has to be greater than for a department store escalator.

Therefore it would be desirable to provide measures to manufacture and run a heavy load escalator with a constructional effort, which is nearly as low as the one of a department store escalator.

DE-A 1756813 describes a roller-step-chain connection of escalators in which the step bolt is provided between two joints of the driving chain. The rollers are preferably provided between two joints of the driving chain inside or outside the inner plates or outer plates. These two selectable possibilities can be used for a department store escalator (roller placed inside) on the one hand, and for a heavy load escalator (roller placed outside) on the other hand.

OBJECTS OF THE INVENTION

It is an object of the invention to improve the drive system for escalators and pedestrian conveyors, such that a simplification of the constructional effort, in particular regarding heavy load escalators or pedestrian conveyors, is obtained, so that eventually parts, which have the same structural form or are cognate, can be used without that having a negative effect on the different driving forces.

SUMMARY OF THE INVENTION

This and other objects of the invention are achieved by a drive system for escalators and pedestrian conveyors having a plurality of steps and pallets, respectively. The drive system includes at least one driving chain including links and joints connecting the links. The driving chain has a chain pitch such that there are no more than two links per step or pallet and the driving chain is connectable to the plurality of steps or pallets via bolts that are positioned between two joints and provided with a roller. The drive system also includes a plurality of interspaced reversing elements having a number of teeth that correspond to the chain pitch.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
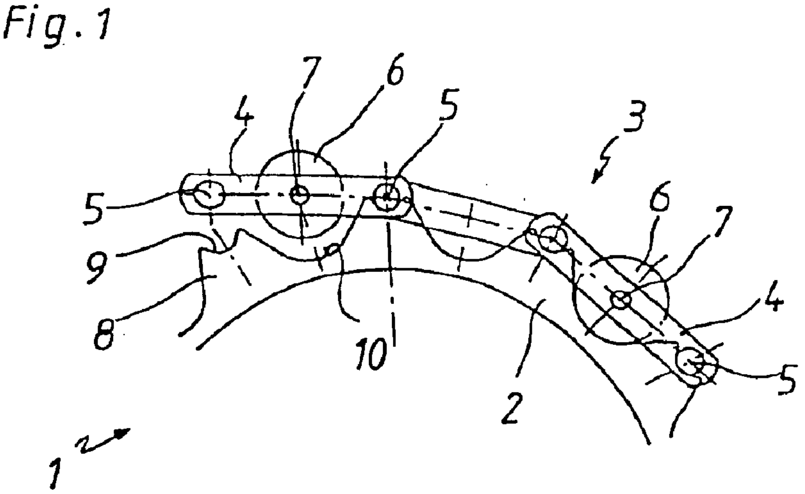
FIG. 1 shows a schematic diagram of an indicated reversing element, in particular a chain wheel, for the driving chain of an escalator.

FIG. 1 shows a schematic diagram of the drive system 1 according to the invention. Drive system 1 can include a reversing element 2, which is formed as chain wheel, as well as a driving chain 3. The driving chain 3 can include a plurality of interconnected links 4, which are connected to each other via joints 5. At approximately half height between the joints 5, rollers 6 can extend, which can be in active relation with the steps of an escalator (not shown in FIG. 1) via step bolts 7. The reversing element 2 can have chain teeth 8, which can be accordingly adapted in reduced manner to the pitch of the driving chain 3. In this example, a tread length of the steps of 400 mm shall be assumed. The chain pitch shall be 200 mm, from which a number of teeth of the reversing element of z=12 results. Other parameters with respect to the tread length require different chain pitches respectively different numbers of teeth.

For example, actual chain pitches corresponding to the state of the art are approximately 133 mm for usual tread lengths of the steps or pallets of approximately 400 mm.

The minimum numbers of teeth of the reversing elements are accordingly chosen with for example z=17, but they can also be different dependent on the diameter of the respective reversing element.

Additionally, an increase of the chain pitch is principally possible in two steps. Under the same conditions (tread length of the steps or pallets of approximately 400 mm) other possible chain pitches would be 200 mm, on the one hand, and 400 mm, on the other hand, i.e. two links per step or pallet or one link per step or pallet. The corresponding numbers of teeth of the reversing elements, in particular of the chain wheels, which should be used then, are only about z=12 or about z=6 (dependent on the diameter of the reversing element). Due to this large chain pitch, the roller of both the department store escalator and the heavy load escalator can be provided between the joints of the driving chain, so that for both systems, uniformly structured driving chains can be used. The construction space of the so called heavy load escalators/heavy load pedestrian conveyors can thus be reduced, which finally also results in a cost reduction.

On the side of the chain, the chain teeth can be provided with recesses 9, which can receive joints 5, whereas the rollers 6 are positioned in corresponding recesses 10 of the reversing element 2. Depending on the design of the drive system 1 it can be useful to lead the rollers 6 around the reversing element 2 in a relatively pressure relieved manner. This can be simply achieved in that the recesses 10 are made larger than the diameter of the rollers, so that the same ones get into contact with the corresponding wall areas of the recesses 10 only partially or not at all.

Figure 2A:
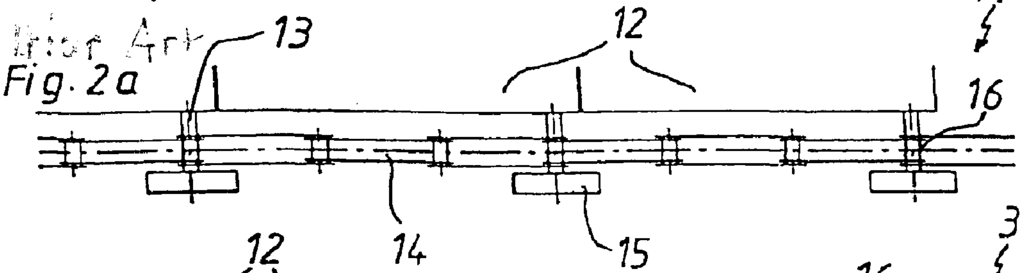
Prior Art Fig. 2a
FIG. 2*a* shows the driving chain of heavy load escalators having a roller, which is placed outside

FIG. 2*a* shows a drive system 11, which represents the state of the art and which is used for a heavy load escalator. Steps 12 are visible, which cooperate via step bolts 13 with rollers 15 provided outside the driving chain 14. Herein, the step bolts 13 extend through the joints 16 of the driving chain 14. Supposing a tread length of approximately 400 mm, a chain pitch of 133 mm results, so that three links of the driving chain 14 are associated to each step 12.

Figure 2B:
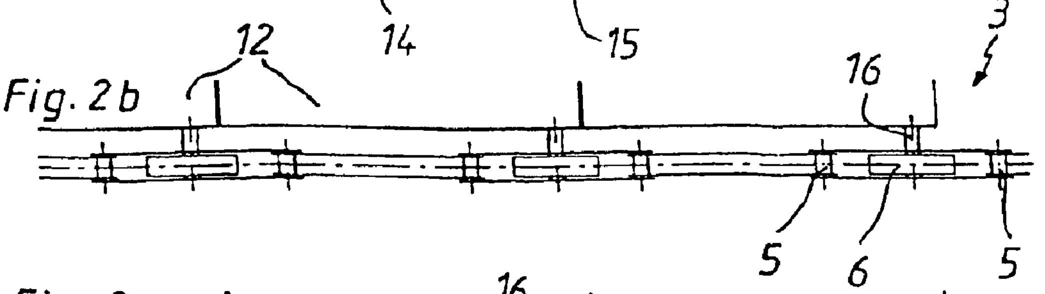
FIG. 2*b* shows driving chains according to the invention having different pitches for the application case according to 2*a;*
Figure 2C:
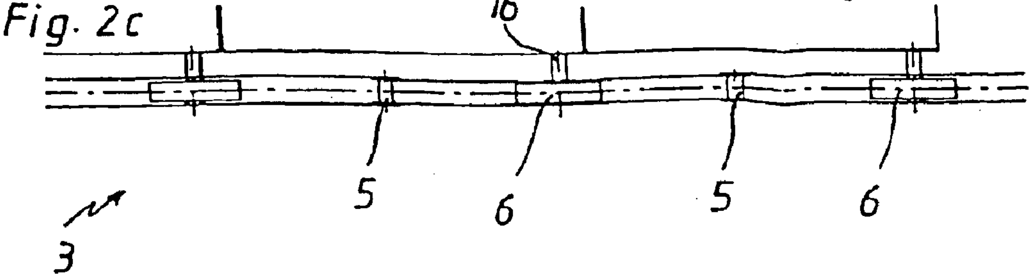
FIG. 2*c* shows driving chains according to the invention having different pitches for the application case according to 2*a;*

FIGS. 2*b* and 2*c* show the driving chain 3 according to the invention. In contrast to the driving chain 11 according to FIG. 2*a*, the rollers 6 are positioned between the joints 5 of the driving chain 3 and connected via step bolt 16 to the respective step 12.

FIG. 2*b* shows a driving chain 3 with a pitch of 200, i.e. two links of the driving chain 3 are provided for each step, whereas FIG. 2*c* shows a driving chain 3 with a pitch of 400 and rollers 6, which are placed inside and which are positioned between the joints 5 of the driving chain 3. Due to this concrete allocation of the chain pitch of the driving chain in active relation with the reversing element 2, which is, regarding the number of teeth, adapted thereto in a reduced manner, a drive system 1 having one and only structure can be used for both a department store escalator and a heavy load escalator.

Figure 3A:
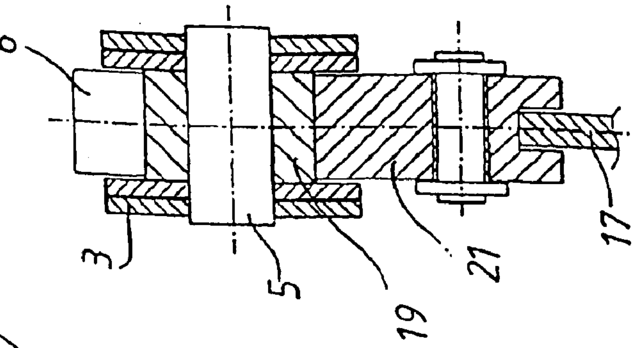
FIG. 3*a* shows a schematic diagram of a relief means for the transition area of an escalator.
Figure 3:
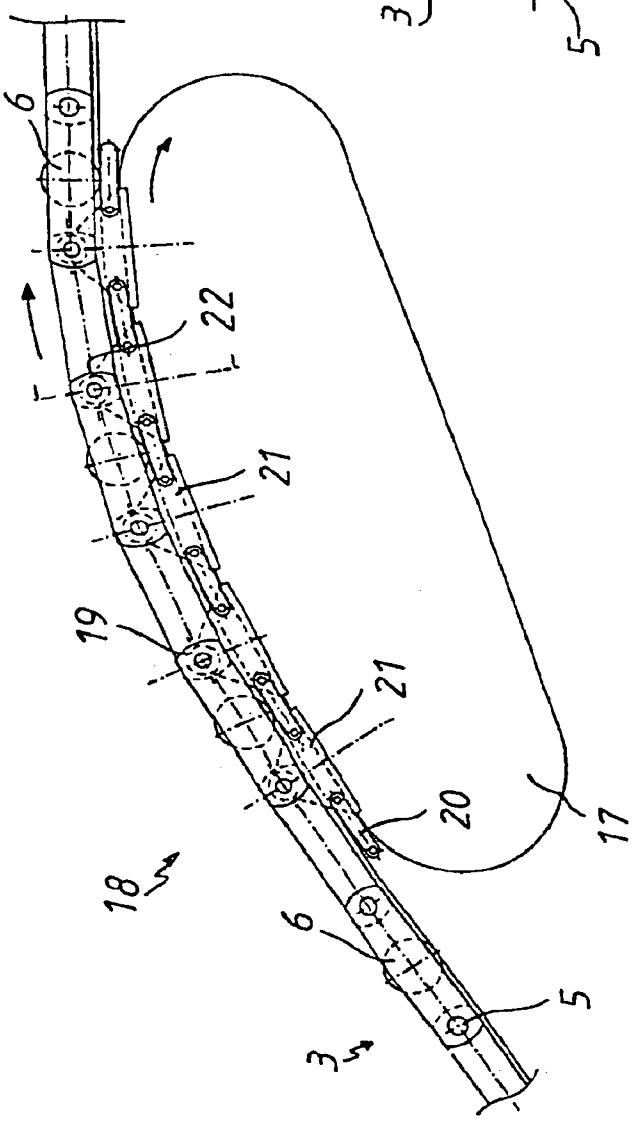
FIG. 3 shows a schematic diagram of a relief means for the transition area of an escalator.

FIG. 3 shows a relief means 17, which can be, for example, placed in the upper transition area 18 of an escalator (not represented in its entirety). Similarly, FIG. 3*a* shows a top view of the driving chain 3 and relief means 17. The driving chain 3 including the joints 5 and the inner rollers 6 is visible. In this example the joints 5 are surrounded by protection rollers 19. The cross-section of the relief means 17 can be arc-shaped and represent a so-called relief curve, which is in active relation with a revolving link chain 20. Herein, the link chain 20 is carried along with the driving chain 3, i.e. it does not require any own drive. Between the links of the link chain 20, so called supporting elements 21 having an approximately triangular cross section are provided, which, on the side of the protection rollers, have corresponding profiles 22 for receiving the same. Due to the fact that the supporting elements 21 receive the protection rollers 19, the rollers 6 are received in a relieving manner by the individual links of the link chain 20, whereby the increased contact pressure, which is just present in this transition area 18, on the rollers 6 can be reduced.

Figure 4:
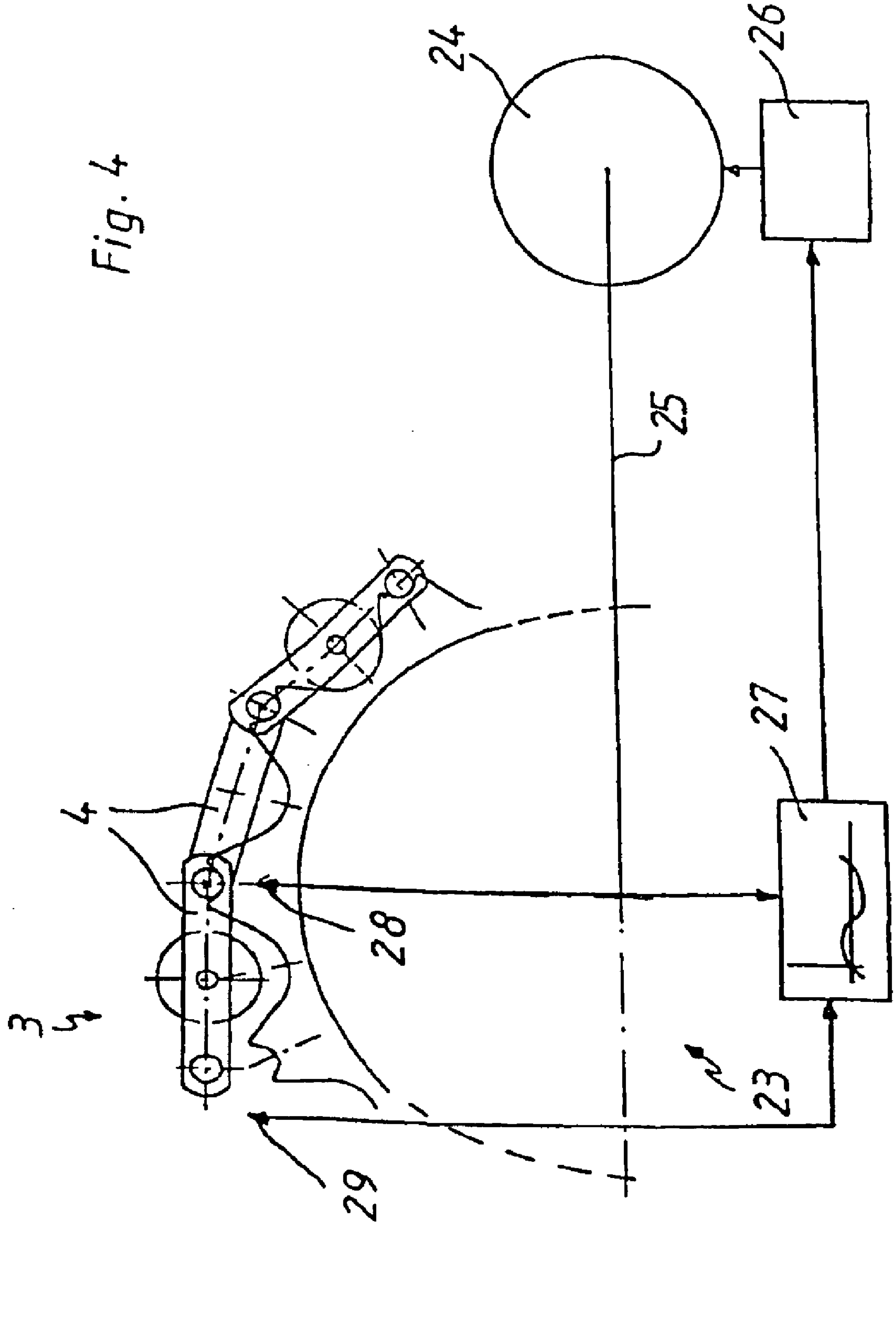
FIG. 4 shows a schematic diagram of a polygon relieved reversing area for the driving chain of a pedestrian conveyor.

FIG. 4 shows a schematic diagram of the drive area 23 of a pedestrian conveyor. The reversing element 2 as well as the driving chain 3, which includes a variety of links 4, are visible. The teeth 8 of the reversing element 2 are only indicated, but their structure can correspond to the one of the elements according to FIG. 1. The drive motor is shown with reference numeral 24 and is, in case of need, in active relation with a gear (not shown). The connection between the drive motor 24 and the reversing element 2 is ensured by a driving element 25. The moving direction of the driving chain 3 or the reversing direction of the reversing element 2 is indicated by arrows. The polygon effects, which are generated at the entry of the driving chain 3 into the reversing element 2 are reduced in that the speed of the reversing element 2 is superimposed by a different speed, which almost corresponds to the mathematical function of the driving chain 3 when entering into the reversing element 2. Thereby, the impact on the entire system and speed variations are minimized. The superimposition is achieved in that the drive motor 24 is in active relation with a frequency converter 26, which controls the drive motor 24 such that this one rotates with a non constant speed and that this non constant speed is transferred in a superimposing manner via the driving element 25 to the reversing element 2. In a control device 27 several control parameters can be stored, which include basic patterns of already existent escalators or pedestrian conveyors, so that one can make use of these basic settings for standard designs.

If the comfort shall be increased, it is possible to detect the phase position of the reversing element 2 by a sensor 28 and to transmit this information to the control device 27. Another parameter can be the revolution speed of the driving chain 3, which is for example detected by another sensor 29, and also these values are transmitted to the control device 27. By means of a corresponding equalization of the values detected by the sensors 28, 29 in comparison to the existent basic pattern(s), the frequency converter 26 can be provided with electric data, such that a continuous control of the drive motor 24 regarding for example different revolution speeds of the driving chain 3 can be achieved.

The operation of the above-described drive system composed of a driving chain and reversing elements can possibly require measures for a reduction of vibrations. According to another aspect of the invention, it is thus proposed that the drive motor, which cooperates with a gear and acts indirectly or directly on the respective reversing element, can be driven in particular via a frequency converter having a non constant speed. By means of this measure, it is possible to reduce the undesired polygon and revolution effects, while essentially maintaining conventional revolution conditions, whereby the quiet running of the escalator or the pedestrian conveyor can considerably be increased.

Usually asynchronous A.C. motors are used, which are brought into active relation with the frequency converter, so that the motor can be driven in such a manner that it rotates with a non constant speed, which then acts accordingly on the respective reversing element, eventually by involving a gear. The varying chain velocities, which are given at the chain entry, are almost compensated by this proposal, i.e. an adaptation takes place, so that the formerly generated impacts are compensated in the system to a large extend.

In order to be able to optimize the chain entry into the respective reversing element, in particular a chain wheel having a reduced number of teeth, it is proposed to relieve the respective driving chain—without reducing the initial tension thereof—before entering the chain wheel, wherein according to another aspect of the invention a so called relief means, which is in particular arc-shaped, is used for the rollers. The relief means is preferably positioned in the upper transition area from the slant to the horizontal line and ensures that the rollers are slightly lifted from their associated running path and are thus pressure relieved. On the arc-shaped relief means, which approximately corresponds to the contour of the transition area, a link chain cooperating with supporting elements is revolving, wherein the supporting elements engage in the area of the joints or protection rollers and direct the same ones upwards.

This revolving link chain is preferably composed of friction bearing material and is carried along with the step chain. The advantage is the planiform rest of the protection roller in the respective supporting element of the relief means, which is in comparison to usual solutions without relative movement only subjected to a very small wear and enables a low surface pressure level.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A drive system for escalators and pedestrian conveyors having a plurality of steps and pallets respectively, the drive system comprising:

at least one driving chain including links and joints connecting the links, the driving chain having a chain pitch such that there are no more than two links per step or pallet, the driving chain being connectable to the plurality of steps or pallets via bolts, the bolts being positioned between two joints and provided with a roller;

a plurality of interspaced reversing elements having recesses and a number of teeth that correspond to the chain pitch, wherein each roller is guided in a region of associated recesses of the respective reversing element with at least partial pressure relief; and a relief means for the rollers, the relief means being placed before one of the reversing elements and having the shape of a curve element which is approximately formed corresponding to a contour of a transition area of the escalator or the pedestrian conveyor, wherein the curve element cooperates with a link chain, which can be revolved, and which is provided with spaced supporting elements for relieving the driving chain.

2. The drive system according to claim 1, further comprising:

protection rollers in a region of the joints.

3. The drive system according to claim 1, wherein each tooth of the reversing elements has rounded recesses for receiving and guiding the joints and protection rollers.

4. The drive system according to claim 1, further comprising:

a gear; and a drive motor for cooperating with the gear and acting indirectly or directly on a respective reversing element, and having a frequency converter having a non-constant speed for driving the drive motor.

5. The drive system according to claim 1, wherein the supporting elements have a nearly triangular cross-section and are provided in the area facing the driving chain for positioning the joint areas of the driving chain.

6. The drive system according to claim 5, wherein the supporting elements have tips, which face the joint areas and are provided with a profile for receiving the joints and the protection rollers.

7. The drive system according to claim 6, wherein one chain link is provided between individual supporting elements, on which the roller can be placed.

8. The drive system according to claim 7, wherein the link chain is made of friction bearing material.

9. The drive system according to claim 8, wherein the link chain can be carried along with the driving chain.

* * * * *